(12) United States Patent
Kim

(10) Patent No.: US 10,395,645 B2
(45) Date of Patent: Aug. 27, 2019

(54) METHOD, APPARATUS, AND COMPUTER-READABLE RECORDING MEDIUM FOR IMPROVING AT LEAST ONE SEMANTIC UNIT SET

(71) Applicant: NAVER CORPORATION, Seongnam-si (KR)

(72) Inventor: Min Chul Kim, Seoul (KR)

(73) Assignee: NAVER Corporation, Seongnam-si (KR)

( * ) Notice: Subject to any disclaimer, the term of this patent is extended or adjusted under 35 U.S.C. 154(b) by 0 days.

(21) Appl. No.: 14/779,037

(22) PCT Filed: Apr. 22, 2015

(86) PCT No.: PCT/KR2015/004010
§ 371 (c)(1),
(2) Date: Sep. 22, 2015

(87) PCT Pub. No.: WO2015/163684
PCT Pub. Date: Oct. 29, 2015

(65) Prior Publication Data
US 2017/0032778 A1    Feb. 2, 2017

(30) Foreign Application Priority Data

Apr. 22, 2014  (KR) .................. 10-2014-0048315
Jun. 24, 2014  (KR) .................. 10-2014-0077056

(51) Int. Cl.
*G10L 15/00* (2013.01)
*G10L 15/06* (2013.01)
*G10L 15/02* (2006.01)
*G10L 15/04* (2013.01)
*G10L 15/18* (2013.01)
(Continued)

(52) U.S. Cl.
CPC ............ *G10L 15/063* (2013.01); *G10L 15/02* (2013.01); *G10L 15/04* (2013.01); *G10L 15/1815* (2013.01); *G10L 15/22* (2013.01); *G10L 25/51* (2013.01); *G10L 25/06* (2013.01); (Continued)

(58) Field of Classification Search
CPC ....................................................... G10L 15/00
USPC ........ 704/235, 205, 231, 234; 434/156, 236, 434/262; 715/257, 816
See application file for complete search history.

(56) References Cited

U.S. PATENT DOCUMENTS 3,663,758 A * 5/1972 Erbert ..................... G10L 15/24
704/231
6,302,698 B1 * 10/2001 Ziv-El ..................... G09B 7/02
434/322
(Continued)

FOREIGN PATENT DOCUMENTS

JP    2000-105597    4/2000
KR    10-2012-0110751    10/2012
(Continued)

OTHER PUBLICATIONS

Kim, Min Chul; U.S. Appl. No. 14/859,433, filed Sep. 21, 2015.

*Primary Examiner* — Michael C Colucci
(74) *Attorney, Agent, or Firm* — Greer Burns & Crain, Ltd.

(57) ABSTRACT

A method, system, and a computer-readable recording medium for improving a set of at least one semantic unit are provided. According to the present invention, a set of at least one semantic unit may be improved by using a phonetic sound or text.

10 Claims, 6 Drawing Sheets

(51) Int. Cl.
  *G10L 25/51* (2013.01)
  *G10L 15/22* (2006.01)
  *G10L 15/08* (2006.01)
  *G10L 25/06* (2013.01)

(52) U.S. Cl.
  CPC ............ *G10L 2015/025* (2013.01); *G10L 2015/0635* (2013.01); *G10L 2015/086* (2013.01)

(56) References Cited

U.S. PATENT DOCUMENTS

| | | | |
|---|---|---|---|
| 8,103,502 B1* | 1/2012 | Bangalore | G06K 9/00355 704/243 |
| 8,606,577 B1 | 12/2013 | Stewart et al. | |
| 8,645,825 B1 | 2/2014 | Cornea et al. | |
| 8,954,329 B2 | 2/2015 | Labsky et al. | |
| 9,292,621 B1 | 3/2016 | Roth | |
| 9,318,108 B2 | 4/2016 | Gruber et al. | |
| 9,489,372 B2 | 11/2016 | Prilepov et al. | |
| 9,715,489 B2 | 7/2017 | Pasquero et al. | |
| 9,922,642 B2 | 3/2018 | Pitschel et al. | |
| 10,134,385 B2 | 11/2018 | Naik | |
| 2004/0181396 A1* | 9/2004 | Lee | G10L 17/26 704/205 |
| 2005/0071170 A1 | 3/2005 | Comerford | |
| 2006/0004570 A1 | 1/2006 | Ju et al. | |
| 2006/0020461 A1* | 1/2006 | Ogawa | G10L 15/04 704/251 |
| 2006/0057545 A1* | 3/2006 | Mozer | G09B 5/06 434/156 |
| 2006/0229878 A1* | 10/2006 | Scheirer | G10H 1/0008 704/273 |
| 2006/0292531 A1* | 12/2006 | Gibson | G09B 7/04 434/236 |
| 2007/0016421 A1* | 1/2007 | Nurminen | G10L 13/08 704/260 |
| 2008/0059152 A1 | 3/2008 | Fridman et al. | |
| 2008/0120102 A1* | 5/2008 | Rao | G10L 15/22 704/235 |
| 2008/0126089 A1* | 5/2008 | Printz | G06Q 30/02 704/235 |
| 2009/0319265 A1* | 12/2009 | Wittenstein | G10L 21/04 704/234 |
| 2009/0326947 A1* | 12/2009 | Arnold | G06Q 30/02 704/257 |
| 2010/0180198 A1* | 7/2010 | Iakobashvili | G06F 17/273 715/257 |
| 2011/0060587 A1* | 3/2011 | Phillips | G10L 15/30 704/235 |
| 2011/0202876 A1* | 8/2011 | Badger | G06F 3/0237 715/816 |
| 2013/0080164 A1* | 3/2013 | Zanolin | G06F 17/273 704/235 |
| 2014/0012582 A1* | 1/2014 | Ganong, III | G10L 15/01 704/257 |
| 2015/0149163 A1* | 5/2015 | VanBlon | G10L 15/08 704/231 |
| 2016/0117940 A1* | 4/2016 | Gomory | A61B 5/167 434/262 |

FOREIGN PATENT DOCUMENTS

| | | |
|---|---|---|
| KR | 10-2013-0008663 | 1/2013 |
| KR | 10-1381101 | 3/2014 |

* cited by examiner

METHOD, APPARATUS, AND COMPUTER-READABLE RECORDING MEDIUM FOR IMPROVING AT LEAST ONE SEMANTIC UNIT SET

TECHNICAL FIELD

The present invention relates to a method, an apparatus, and a computer-readable recording medium for improving at least one semantic unit set (hereinafter simply referred to as "semantic unit") by using a phonetic sound.

CROSS-REFERENCE TO RELATED APPLICATION

This application claims the benefit of Korean Application No. 10-2014-0048315 and Korean Application No. 10-2014-0077056, the disclosures of which are incorporated herein in their entirety by reference.

BACKGROUND ART

There have been attempts to recognize a human being's voice and convert the recognized voice into a standard set of semantic units (i.e., a set including at least one semantic unit). Such a semantic unit set may be output as a digital phonetic sound corresponding to a specific language or written in text of a specific language. In the former case, the semantic unit set may be a digital phonetic sound as a result of analyzing an analog phonetic sound, one of extended voice recognition, and in the latter case, the semantic unit set may be a voice recognition text as a result of narrow voice recognition.

However, the semantic unit set obtained according to the forgoing attempt has a limitation to a degree in terms of quality. For example, numerous locution habits of people, indistinct pronunciations of some people, the use of lexicons or regional dialect not present in dictionaries, surrounding environments including noise, and the like, substantially make it difficult to derive a semantic unit set according to voice recognition techniques.

Thus, the inventor of the present application proposes a new technique for obtaining a semantic unit set having excellent quality by improving at least one semantic unit set by using an improvement phonetic sound (that is, a phonetic sound separately uttered for improvement).

Here, a semantic unit set as a target for improvement by an improvement phonetic sound may not necessarily be limited to one obtained by a voice recognition technology. For example, a semantic unit set as a target of improvement may be a set initially input as text (that is, it may not be a semantic unit set obtained based on the voice recognition technique).

Conversely, even a case in which a semantic unit set as a target of improvement is a set obtained based on the voice recognition technique, and in order to improve the semantic unit set, using improvement text, rather than an improvement phonetic sound, may also be assumed.

The inventor of the present application also proposes a new technique that may be used for the various cases as mentioned above.

The above information disclosed in this Background section is only for enhancement of understanding of the background of the invention and therefore it may contain information that does not form the prior art that is already known in this country to a person of ordinary skill in the art.

DISCLOSURE

Technical Problem

Technical Subject

The present invention has been made in an effort to solve all the problems of the related art.

The present invention has also been made in an effort to improve at least one semantic unit set by using a phonetic sound or text.

The present invention has also been made in an effort to easily and accurately improve a result of voice recognition.

The present invention has also been made in an effort to easily and accurately improve a result of text input.

Technical Solution

A set including at least one semantic unit may be improved by an improvement phonetic sound according to the present invention described hereinafter, regardless of whether the set is a digital phonetic sound or text as an outcome obtained by recognizing a human being's analog voice through a predetermined electronic device (not shown) or regardless of whether the set is a digital phonetic sound input through an electronic device (not shown) (for example, input by a keyboard or a keypad) and subsequently output based on a text to speech (TTS) technique or regardless of whether the set is text input and subsequently displayed on a screen. An aspect of such improvement may include correction of a voice recognition result or correction of a typo in displayed text after being input.

Meanwhile, a set including at least one semantic unit may be improved by improvement text according to the present invention described hereinafter, when the set is a digital phonetic sound or text as an outcome obtained by recognizing a human being's analog voice through a predetermined electronic device (not shown). As an aspect of such an improvement may include correction of a voice recognition result.

In this point of view, a representative configuration of the present invention is as follows.

An exemplary embodiment of the present invention provides a method for improving a set including at least one semantic unit, in which the set including at least one semantic unit is a captured semantic unit set, including: receiving an improvement phonetic sound according to utterance of a user; specifying an improvement semantic unit set on the basis of the improvement phonetic sound; specifying a semantic unit set as a target to be actually improved within the captured semantic unit set, as a matched semantic unit set, on the basis of correlation thereof with the improvement semantic unit set; and replacing the matched semantic unit set within the captured semantic unit set with the improvement semantic unit set.

Another exemplary embodiment of the present invention provides a computer-readable recording medium storing a computer program for executing another method, another apparatus, and the foregoing method.

Advantageous Effects

According to an embodiment of the present invention, a set of at least one semantic unit may be improved by using a phonetic sound.

According to an embodiment of the present invention, a result of voice recognition may be easily and accurately improved.

According to an embodiment of the present invention, a result of text input may be easily and accurately improved.

MODE FOR INVENTION

Figure 1:
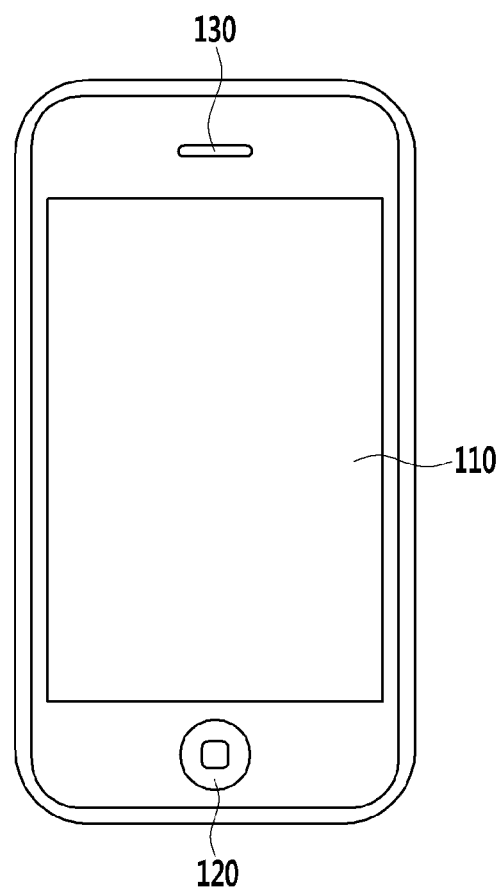
FIG. 1 is a view schematically illustrating an appearance of a semantic unit improving device according to an exemplary embodiment of the present invention.

In the following detailed description, reference is made to the accompanying drawings that show, by way of illustration, particular embodiments in which the invention may be practiced. These embodiments are described in sufficient detail to enable those skilled in the art to practice the invention. It is to be understood that the various embodiments of the invention, although different, are not necessarily mutually exclusive. For example, a certain feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Hereinafter, embodiments will be described in detail with reference to the accompanying drawings such that they can be easily practiced by those skilled in the art to which the present invention pertains.

[Exemplary Embodiment of Present Invention]

Configuration of Device

FIG. 1 is a view schematically illustrating an appearance of a semantic unit improving device according to an exemplary embodiment of the present invention.

As illustrated in FIG. 1, the semantic unit improving device 100 includes a display unit 110 (for example, a display panel) displaying visual information regarding various semantic unit sets, or the like, for a user, a button unit 120 (for example, a home button of a smartphone) performing a predetermined function when the user presses or touches the button unit 120 according to types of the semantic unit improving device 100, a sound output unit 130 (for example, a speaker) outputting a voice or a sound generated in the semantic unit improving device 100, an acoustic sensor (typically, a microphone disposed below the button unit 120) (not shown), and any known electric/electronic components (not shown). In FIG. 1, the semantic unit improving device 100 is illustrated as a smartphone, but the semantic unit improving device 100 is not limited thereto, and any digital device may be employed as the semantic unit improving device 100 as long as it includes a memory unit and a microprocessor supporting computation capability, such as a desktop computer, a notebook computer, a work station, a personal digital assistant (PDA), a Web pad, a mobile phone (excluding a smartphone), various smart wearable devices (e.g., a smart watch, a smart band, smart glasses, or a smart ring).

Meanwhile, the display unit 110 may serve as a known touch panel and further perform a function to receive user's text input. Here, the user's text input may be performed through a keyboard/keypad (not shown) on the touch panel provided by software by interworking with the touch panel. However, the semantic unit improving apparatus 100 may receive the user's text input by including a separate hardware keyboard/keypad (not shown).

Figure 2:
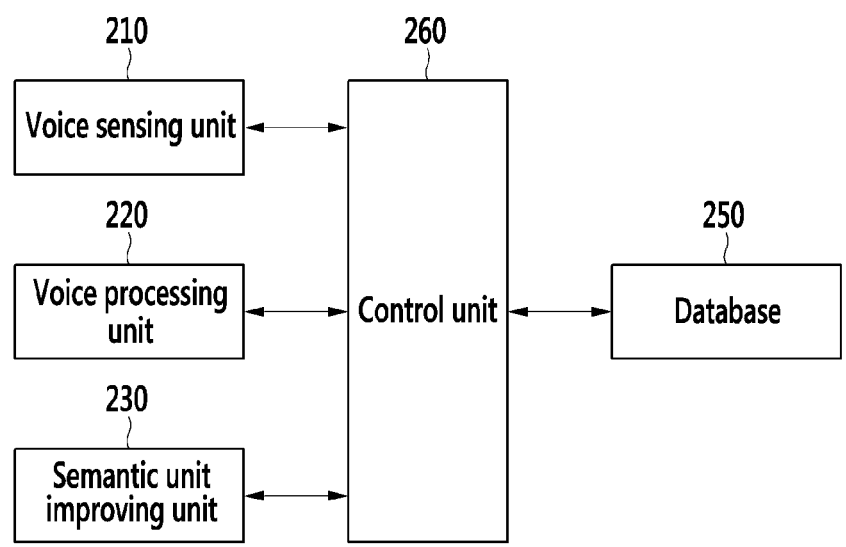
FIG. 2 is a block diagram conceptually illustrating an internal configuration of the semantic unit improving device according to an exemplary embodiment of the present invention.

Hereinafter, an internal configuration of the semantic unit improving device 100 will be described in detail with reference to FIG. 2. FIG. 2 is a block diagram conceptually illustrating an internal configuration of the semantic unit improving device according to an exemplary embodiment of the present invention.

As illustrated in FIG. 2, the semantic unit improving device 100 according to an exemplary embodiment of the present invention may include a voice sensing unit 210, a voice processing unit 220, a semantic unit improving unit 230, a database 250, and a control unit 260. According to an exemplary embodiment of the present invention, at least a portion of the voice sensing unit 210, the voice processing unit 220, the semantic unit improving unit 230, the database 250, and the control unit 260 may be a program module for performing predetermined calculations, controlling other hardware components or software components, or communicating with such components. The program module maybe included as an operating system, an application program module, or other program module in the semantic unit improving device 100, and may be physically stored in various known storage devices. Also, such a program module may be stored in a remote storage device (not shown) or even in an external electronic device (not shown) able to communicate with the semantic unit improving device 100. Thus, at least a portion of functions of the semantic unit improving device 100 may be executed by an external electronic device, or the like, according to free choice by a person skilled in the art. The program modules may be stored on remote memory devices communicable to the terminal 200. The program modules may include, but not be subject to, a routine, a subroutine, a program, an object, a component, and a data structure for executing a specific operation or a type of specific abstract data that will be described in accordance with the present invention.

First, the voice sensing unit 210 according to an exemplary embodiment of the present invention may execute a function to sense a voice uttered by a user, that is, an analog voice corresponding to a greater semantic unit set including at least one semantic unit set to be improved, or an improvement phonetic sound that may be uttered separately by a user for such an improvement described above.

To this end, the voice sensing unit 210 may include the aforementioned acoustic sensor as part thereof or may at least communicate with the acoustic sensor. The acoustic sensor may include, for example, a noise sensor able to sense even a voice signal having a small amplitude, a vibration sensor, and an ultrasonic sensor, as well as a general acoustic sensor such as a microphone.

The acoustic sensor may be disposed in at least a portion of the voice sensing unit 210, a chassis, a main board (not shown), a printed circuit board (PCB) (not shown), and an enclosure (not shown) of the semantic unit improving device 100.

The voice sensing unit 210 may transfer an analog signal of the sensed voice to the voice processing unit 220 as described hereinafter.

The voice processing unit 220 according to an exemplary embodiment of the present invention may serve to convert the analog voice signal transferred from the voice sensing unit 210 into a digital signal.

The voice processing unit 220 may include a known analog-to-digital converter (ADC). Thus, the voice processing unit 220 may convert the signal of the voice corresponding to the greater semantic unit set including the semantic unit set as a target or improvement (i.e., to be improved) or the signal for the improvement phonetic sound from the analog signal to the digital signal by performing at least one of a sampling process, a quantization process, and an encoding process.

Also, the voice processing unit 220 may amplify the voice signal, cancel noise from the voice signal, selectively receive only a voice signal of a specific frequency band, or change a waveform of the voice signal. To this end, the voice processing unit 220 may include a known amplifier, a known noise filter, a known bandpass/band reject filter, a Kalman filter, an EMA filter, or a Savitzky-Golay filter. The voice processing unit 220 may convert a voice signal of a time domain into a voice signal of a frequency domain or convert a voice signal of a frequency domain into a voice signal of a time domain.

The voice processing unit 220 may transfer the digital phonetic sound signal, an outcome of the processing, to the semantic unit improving unit 230 as described hereinafter.

The semantic unit improving unit 230 according to an exemplary embodiment of the present invention may capture a greater semantic unit set including a specific semantic unit set as a target of improvement, according to the digital phonetic sound signal transferred from the voice processing unit 220. The greater semantic unit set may physically be a corresponding digital phonetic sound itself or may be a result of conversion to the text. In the later case, or for other voice recognition needs as described hereinafter, the semantic unit improving unit 230 may include a known voice recognition module, or may interwork therewith. Hereinafter, the aforementioned semantic unit set will be referred to as a "captured semantic unit set".

The semantic unit improving unit 230 may also specify the improvement phonetic sound according to the digital phonetic sound signal transferred from the voice processing unit 220. Hereinafter, a semantic unit set corresponding to the specified improvement phonetic sound as described above will be referred to as an "improvement semantic unit set". The "improvement semantic unit set" may physically be the corresponding digital phonetic sound itself or a result of conversion into the text.

Also, the captured semantic unit set handled by the semantic unit improving unit 230 may not necessarily originate from a digital phonetic sound signal. That is, for example, a semantic unit set corresponding to text obtained through user's key input or reading of an optical character, irrespective of generation of analog or digital phonetic sound, may also be the captured semantic unit set as mentioned above.

Meanwhile, a predetermined improvement text may form an improvement semantic unit set. For example, text input by a user through a keyboard may directly be an improvement semantic unit set.

To sum up, the number of cases regarding the relationship between a captured semantic unit set and an improvement semantic unit set may be obtained as shown in Table 1 below.

TABLE 1

| Case | Captured semantic unit set | Improvement semantic unit set |
|---|---|---|
| 1 | Digital phonetic sound | Digital phonetic sound |
| 2 | Result of converting digital phonetic sound into text | Digital phonetic sound |
| 3 | Text obtained according to user's key input | Digital phonetic sound |
| 4 | Digital phonetic sound | Result of converting digital phonetic sound into text |
| 5 | Result of converting digital phonetic sound into text | Result of converting digital phonetic sound into text |
| 6 | Text obtained according to user's key input | Result of converting digital phonetic sound into text |
| 7 | Digital phonetic sound | Text obtained according to user's key input |
| 8 | Result of converting digital phonetic sound into text | Text obtained according to user's key input |

The semantic unit improving unit 230 may compare the captured semantic unit set and the improvement semantic unit set, and extract a semantic unit set, as an actual target for improvement, having a high correlation with the improvement semantic unit set from the captured semantic unit set. Such extraction may also be called matching between the semantic unit set as a target of improvement and the improvement semantic unit set. The comparison performed for matching may be comparison between digital phonetic sounds, comparison between texts, or comparison between a digital phonetic sound and text (in this case, one of digital phonetic sound and text may need to be converted into the same format as that of the other in advance). The matched semantic unit set as a target for improvement will be referred to as a "matched semantic unit set" for the purposes of description. Only one matched semantic unit set or a plurality of semantic unit sets may exist in one captured semantic unit set.

The semantic unit improving unit 230 may further utilize information based on a user input (i.e., an input other than utterance of a phonetic sound for improvement or an input of improvement text) for the purpose of matching. For example, when a plurality of semantic unit sets having a relatively high correlation are extracted, the user may be allowed to passively select at least a portion of the plurality of semantic unit sets, to determine a matched semantic unit set.

Matching according to an exemplary embodiment of the present invention will be described further hereinafter.

Thereafter, the semantic unit improving unit 230 may improve the matched semantic unit set on the basis of the improvement semantic unit set. That is, the matched semantic unit set may be replaced with the improvement semantic unit set. Such replacement may be deleting the matched semantic unit set present in the captured semantic unit set and inserting the improvement semantic unit set in its place.

The outcome may be that the captured semantic unit set has improved quality, while maintaining a physical format. Such an outcome may physically be a digital phonetic sound or text.

Improvement of the semantic unit set according to an exemplary embodiment of the present invention will be described further hereinafter.

Thereafter, the captured semantic unit set, the improvement semantic unit set, and the information regarding the matching may be stored in the database 250 according to an exemplary embodiment of the present invention. Even though the database 250 is illustrated to be included in the semantic unit improving device 100, the database 250 may also be configured as a separate element from the semantic unit improving device 100 as necessary. The database 250 according to an exemplary embodiment of the present invention may have a concept including a computer-readable recording medium, and may be a database including data records, or the like, based on a file system in a broad sense, as well as a database in a narrow sense, and even a simple set of logs may be the database 250 according to an exemplary embodiment of the present invention as long as the set of logs may be searched to extract data.

The control unit 260 according to an exemplary embodiment of the present invention may serve to control a flow of data among the voice sensing unit 210, the voice processing unit 220, the semantic unit improving unit 230, and the database 250. That is, the control unit 260 may control a data flow among the elements of the semantic unit improving device 100, thus allowing the voice sensing unit 210, the voice processing unit 220, the semantic unit improving unit 230, and the database 250 to perform an inherent function thereof.

Matching

Figure 3:
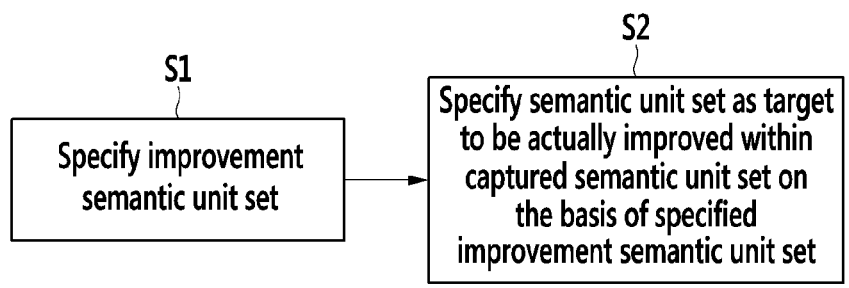
FIG. 3 is a flowchart illustrating a matching method according to an exemplary embodiment of the present invention.

Hereinafter, matching simply mentioned above will be described in detail with reference to FIG. 3. FIG. 3 is a flowchart illustrating a matching method according to an exemplary embodiment of the present invention.

First, the semantic unit improving unit 230 may specify an improvement semantic unit set (S1).

According to an exemplary embodiment, the semantic unit improving unit 230 may specify a voice of a digital signal transferred before or after (or immediately before or immediately after) a predetermined instruction of the user, among digital phonetic sound signals transferred from the voice processing unit 220, as a voice to be improved, namely, as an improvement semantic unit set (the foregoing instruction may be a user's utterance of a pre-arranged word or input of a pre-arranged key).

For example, when the user utters a phrase such as "I can correct typing at all without backspace error" and subsequently issues a predetermined instruction, a digital phonetic sound corresponding to "error" or text converted from the digital phonetic sound according to voice recognition may be specified as an improvement semantic unit set. Such specifying may be based on a time interval between a voice portion (i.e., improvement phonetic sound) corresponding to "error" and a voice portion in front of "error" (i.e., a voice portion corresponding to "backspace" or a voice portion corresponding to "without backspace") being equal to or greater than a predetermined threshold value. Meanwhile, in this example, a digital phonetic sound corresponding to "I can correct typing at all without backspace" or text converted from the digital phonetic sound according to voice recognition may be a captured semantic unit set.

According to another exemplary embodiment, for example, even when the user utters "error" before or after issuing a predetermined instruction intending to improve text (i.e., the captured semantic unit set) such as "I can correct typing at all without backspace" displayed on a screen, the semantic unit improving unit 230 may specify an improvement semantic unit set on the basis of a corresponding digital phonetic sound.

Also, according to another exemplary embodiment, after the user utters a phrase corresponding to "I can correct typing at all without backspace" and subsequently views that the text is displayed on the screen, when the user inputs improvement text such as "error" through a keyboard before or after (or immediately before or immediately after) issuing a predetermined instruction intending to improve the text displayed on the screen, the semantic unit improving unit 230 may specify an improvement semantic unit set on the basis of the corresponding digital phonetic sound.

Thereafter, the semantic unit improving unit 230 may specify a semantic unit set as an actual target of improvement within the captured semantic unit set, on the basis of the specified improvement semantic unit set (S2).

Before performing the foregoing step, as described above, a greater semantic unit set including the specific semantic unit set as an actual target of improvement may have been captured. Such a captured semantic unit set may be a semantic set such as "I can correct typing at all without backspace" as mentioned above.

The semantic unit improving unit 230 may divide and expand the captured semantic unit set into portions such as "I can", "can correct", "correct typing", "typing at", "at all", "all without", "without backspace" on the basis of a time interval or space between units within the captured semantic unit set and/or a length of the improvement semantic unit set (for example, a time duration of a corresponding digital phonetic sound signal, a length of text, the number of corresponding syntactic words, the number of words, the number of syllables, the number of letters, and the number of glossemes), and compare the divided portions with the improvement semantic unit set. Of course, the semantic unit improving unit 230 may divide the captured semantic unit set into portions such as "I", can, "correct", "typing", at, all, "without", and "backspace", or may divide the captured semantic unit set into "cor", "rect", or the like, rather than "correct". In such a case, one or more of the portions may be compared with the improvement semantic unit set. In the above and below, dividing and expanding the captured semantic unit set in order to compare the captured semantic unit set with the improvement semantic unit set are described, but in addition to separating (dividing) of the captured semantic unit set into portions or expanding the portions (that is, arrangements of the portions overlap each other), any other scheme may also be adopted as long as the portions of the captured semantic unit set are compared with the improvement semantic unit set.

In case of comparison between digital phonetic sounds, such comparison may be comparison between characteristics of digital phonetic sounds in a time domain or frequency domain. A feature point in a wave of a digital phonetic sound signal may be typical among voice characteristics. That is, as more common feature points are discovered between two digital phonetic sound signals within the same play time interval, the two digital phonetic sounds may be considered to have higher correlation. However, in order to compare digital phonetic sounds, various algorithms may be used, and thus features (characteristics) of a digital phonetic sound to be considered may freely include one or more of the following.

(1) Characteristics of Voice Signal in Time Domain

Maximum amplitude, average amplitude, average frequency, average value, standard deviation, standard deviation normalized by overall amplitude, variance, skewness, kurtosis, sum, absolute sum, root mean square (RMS), crest factor, dispersion, entropy, power sum, center of mass, coefficients of variation, cross-correlation, zero-crossings, seasonality, DC bias, or the characteristics described above calculated for derivatives of primary, secondary, tertiary, or higher order of the voice signal (2) Characteristics of Voice Signal in Frequency Domain Spectral centroid, spectral density, spherical harmonics, total average spectral energy, band energy ratio for every octave, log spectral band ratio, linear prediction-based cepstral coefficients (LPCC), perceptual linear prediction (PLP) cepstral coefficient, mel-frequency cepstral coefficient, frequency phase, the characteristics described above calculated for derivatives of primary, secondary, tertiary, or higher order of the voice signal in frequency domain expression Meanwhile, the aforementioned comparison may be comparison between texts. In this case, the texts may be compared in relation to at least one of a synthetic word, a word, a syllable, a letter, and a glosseme thereof. For the comparison, one or more known text comparison algorithms may be employed. For example, two texts having a high sequential similarity (for example, similarity in a phonetic value or spelling) of syllables may be defined as texts having high correlation.

According to the comparison result, the semantic unit improving unit 230 may determine a portion having a high correlation with the improvement semantic unit set within the captured semantic unit set, as a matched semantic unit set. As a result, in the above example, a digital phonetic sound or text corresponding to the portion "at all" may be determined as a matched semantic unit set.

Specific Comparison Method

Here, the comparison method performed by the semantic unit improving unit 230 will be described in more detail. It should be appreciated that one or more methods for calculating a correlation score described herein are freely adopted by a person skilled in the art for the best comparison between a portion of a captured semantic unit set and an improvement semantic unit set.

The semantic unit improving unit 230 resultantly compares digital phonetic sounds or texts in any of the cases 1 to 8 mentioned above. This is because, even when a digital phonetic sound and text are compared, formats of two semantic unit sets are unified to one of a digital phonetic sound and text, before regular comparison. To this end, the semantic unit improving unit 230 may include a known voice recognition module and/or a known TTS module, or at least interwork therewith.

Figure 5:
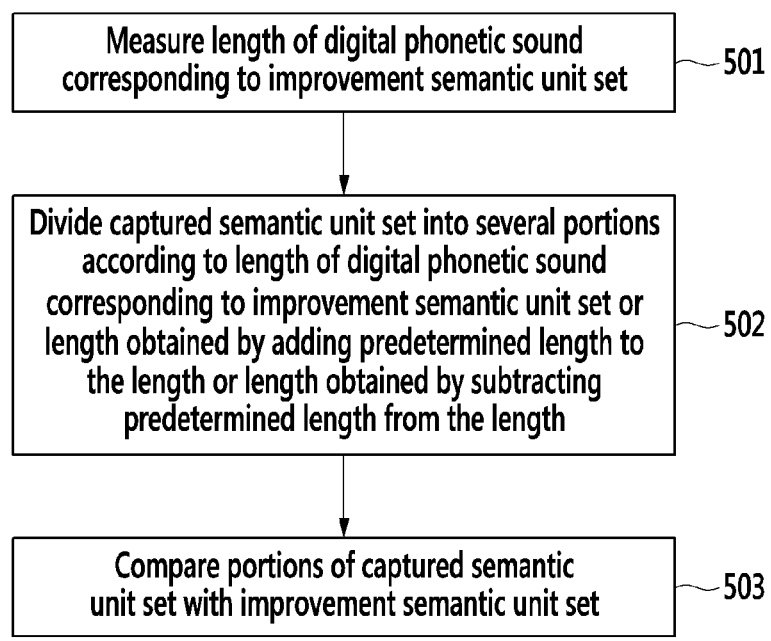
FIG. 5 is a flowchart illustrating a digital phonetic sound comparing method according to an exemplary embodiment of the present invention.

First, a case of performing comparison between digital phonetic sounds will be described with reference to FIG. 5. FIG. 5 is a flowchart illustrating a digital phonetic sound comparing method according to an exemplary embodiment of the present invention.

In step 501, the semantic unit improving unit 230 may measure a length of a digital phonetic sound corresponding to an improvement semantic unit set. A unit of such a length may generally be time (seconds).

In step 502, the semantic unit improving unit 230 may divide the captured semantic unit set into several portions according to the length or a length obtained by adding a predetermined length to the length or subtracting the predetermined length from the length, and expand the portions. For example, when the captured semantic unit set is a digital phonetic sound whose play time is 10 seconds and the improvement semantic unit set is a digital phonetic sound whose play time is one second, the captured semantic unit set may be divided into 91 portions whose corresponding play time intervals are 0 to 1 sec, 0.1 to 1.1 sec, . . . , 8.9 to 9.9 sec, and 9 to 10 sec, and the divided portions may be expanded. The number of the foregoing portions may be appropriately adjusted according to performance of the semantic unit improving unit 230 and the semantic unit improving device 100.

In step 503, the semantic unit improving unit 230 may compare the portions of the captured semantic unit set with the improvement semantic unit set. The essence of the comparison may be comparison between characteristics of digital phonetic sound signals. Such comparison may include a predetermined correlation score calculation. For example, a correlation score may be accumulatively increased each time the same or similar feature point between two digital phonetic sound signals is discovered within mutually corresponding time intervals. A determined correlation score may be given to a corresponding portion of the captured semantic unit set. Of course, conformity or a conformity degree of various characteristics (including characteristics in a frequency domain) as described above may also be used as a basis for calculating a correlation score.

Step 503 may be repeatedly performed as necessary. That is, after the user is induced to utter the improvement phonetic sound to the same effect two or more times, the semantic unit improving unit 230 may repeatedly performed correlation score calculation based on comparison between digital phonetic sounds regarding the entirety of the portions of the captured semantic unit set or a portion thereof which has already been given a predetermined correlation score, two or more times. After the repeated correlation score calculations, a portion of the captured semantic unit set given the highest correlation score (accumulated score or average score) may be determined as a matched semantic unit set.

Figure 6:
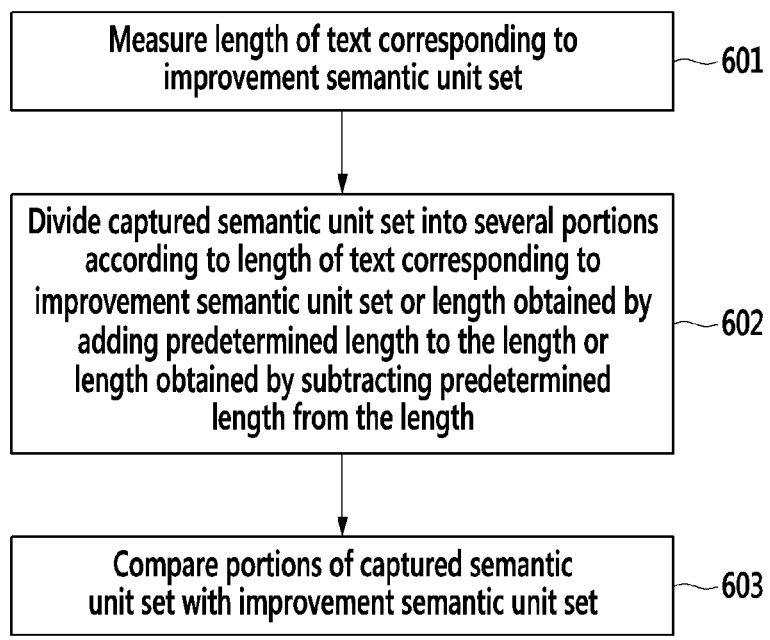
FIG. 6 is a flowchart illustrating a text comparing method according to an exemplary embodiment of the present invention.

Hereinafter, a case in which texts are compared will be described with reference to FIG. 6. FIG. 6 is a flowchart illustrating a text comparing method according to an exemplary embodiment of the present invention.

In step 601, the semantic unit improving unit 230 may measure a length of text corresponding to an improvement semantic unit set. Such a length of text may generally be expressed by the number of syntactic words, words, syllables, letters, or glossemes. For example, the text corresponding to the improvement semantic unit set may be "error", and "error" has a length of two syllables.

In step 602, the semantic unit improving unit 230 may divide the captured semantic unit set into several portions according to the length or a length obtained by adding a predetermined length to the length or subtracting the predetermined length from the length, and expand the portions. For example, when the captured semantic unit set is text such as "I can correct typing at all without backspace", expanded portions after the captured semantic unit set is divided may variously include "I", "can", "correct", "I can", "can correct", "I can correct", "cor", and "rect" (the other portions of the captured semantic unit set are no different). Here, the expanded portions after the captured semantic unit set is most desirably divided may be those that have two syllables such as "I can", "can cor", "correct", "rect ty", "typing", "ping at", "at all", "all with", "without", "out back", and "backspace".

The number of the foregoing portions may be appropriately adjusted according to performance of the semantic unit improving unit 230 and the semantic unit improving device 100.

In step 603, the semantic unit improving unit 230 may compare the portions of the captured semantic unit set with the improvement semantic unit set. The comparison may be sequential comparison regarding at least one of syntactic words, words, syllables, letters, and glossemes between the texts. Such comparison may include a predetermined correlation score calculation. For example, a correlation score may be accumulatively increased each time the same or similar syllable between two texts is discovered in mutually corresponding positions. A determined correlation score may be given to a corresponding portion of the captured semantic unit set. Here, what is determined to be similar between the two texts may be syllables similar in spelling or may rather be syllables similar in a phonetic value. For example, in a case in which text corresponding to a portion of the captured semantic unit set is "at all" and text corresponding to the improvement semantic unit set is "error", the syllables "all" and "or" including "l" and "r", the same liquid consonants, may be determined to be similar. It may inevitably increase a correlation score of the portion "at all" among the portions of the captured semantic unit set.

Meanwhile, the comparison may be overall comparison based on semantic correlation between texts. Such a correlation may be discovered according to whether two words respectively corresponding to two texts belong to the same category or actually indicate a similar meaning (a category or a meaning of a word may be referred to in a known linguistic library). For example, in a case in which a captured semantic unit set is text of "I can do it this Saturday" and text of an improvement semantic unit set is "may" or "Friday", the improvement semantic unit set "may" may be recognized to have semantic correlation (i.e., auxiliary verb in English) with a portion of the captured semantic unit set "can" (it actually is even though phonetic values and spellings thereof are completely different), and the improvement semantic unit set "Friday" may be recognized to have a semantic correlation (i.e., a category of day of week) with "Saturday", a portion of the captured semantic unit set (it actually is even though phonetic values and spellings thereof are completely different in front portions thereof). The discovered correlation may cause a correlation score of the portion of the captured semantic unit set corresponding thereto.

On the other hand, the comparison may be comparison based on a key position correlation between texts. In this comparison, spellings of text of a portion belonging to a captured semantic unit set and spellings of text of an improvement semantic unit set may be sequentially compared, and even when it is determined that different spellings are positioned to be adjacent to each other in a keyboard, as well as in a case in which the same spellings are discovered, according to the comparison result, a correlation score is given to the foregoing portion. For example, when a QWERTY keyboard is used, "wyw", text of a portion of a captured semantic unit set may be determined to have a high correlation score with "eye", text of an improvement semantic unit set which is completely different in a phonetic value or spelling.

Step 603 may be repeatedly performed as necessary. That is, after the user is induced to utter the improvement phonetic sound to the same effect two or more times, the semantic unit improving unit 230 may repeatedly performed correlation score calculation based on comparison between texts regarding the entirety of the portions of the captured semantic unit set or a portion thereof which has already been given a predetermined correlation score, two or more times. After the repeated correlation score calculations, a portion of the captured semantic unit set given the highest correlation score (accumulated score or average score) may be determined as a matched semantic unit set.

According to an exemplary embodiment of the present invention, in order to more reasonably derive a correlation score, two or more correlation score calculation methods as described above may be adopted together. In such a case, a value obtained by multiplying a correlation score and a corresponding weight according to one method may be added to a value obtained by multiplying a correlation score and a corresponding weight according to another method. Accordingly, the derived correlation score may be a composite correlation score. Also, in this case, one or several portions of the captured semantic unit set having a high composite correlation score may be matched semantic unit sets.

A weight multiplied by a correlation score according to one method may be differently determined according to environments of the semantic unit improving device 100 or user intentions. For example, when the user repeatedly utters an improvement phonetic sound in order to generate an improvement semantic unit set, a higher weight may be given to a correlation score based on digital phonetic sound comparison. Alternatively, when the user creates text corresponding to a captured semantic unit set through a small touch panel with which an error may occur easily, a high weight may be given to a correlation score reflecting a key adjacency relationship on a keyboard, among correlation scores based on text comparison.

Improvement of semantic unit set

Figure 4:
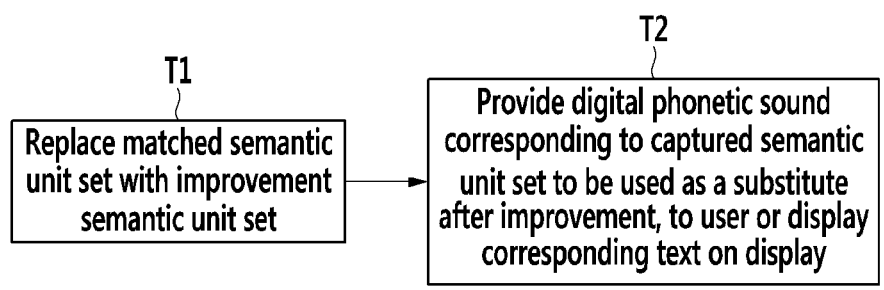
FIG. 4 is a flowchart illustrating a semantic unit improving method according to an exemplary embodiment of the present invention.

Hereinafter, improvement of a semantic unit set briefly described above will be described in detail with reference to FIG. 4. FIG. 4 is a flowchart illustrating an improving method according to an exemplary embodiment of the present invention.

First, the semantic unit improving unit 230 may replace the matched semantic unit set with the improvement semantic unit set (step T1). Here, as an outcome of the replacement, the captured semantic unit set may include the improvement semantic unit set instead of the matched semantic unit set. Such an outcome of the replacement may be an improved voice recognition result or improved text. According to the foregoing example, the improved voice recognition result or text may be "I can correct typing error without backspace". The improved voice recognition result or text may accurately meet the user's original intention.

The semantic unit improving unit 230 may provide a digital phonetic sound corresponding to the captured semantic unit set to be used as a substitute after improvement to the user or may display corresponding text (step T2). Thus, according to the foregoing example, the digital phonetic sound or text corresponding to the semantic unit set of "I can correct typing error without backspace" may be heard or displayed to the user.

Here, however, the improvement phonetic sound may not guarantee sufficient improvement according to circumstances (the improvement text does not substantially have such a problem). That is, quality of the improvement phonetic sound is not sufficiently high from the beginning due to a problem (for example, inaccuracy in pronunciation, the use of dialect, etc.) inherent in a user, and thus the improvement phonetic sound is erroneously recognized as corresponding to another semantic unit set, or even though quality of the improvement phonetic sound is not so low, the improvement phonetic sound is erroneously recognized as corresponding to another semantic unit set during a specific process due to an environment problem (for example, an environment involving noise, a low specification of the semantic unit improving device 100, etc.). In such a case, what is heard or displayed to the user after the attempt of improvement may not be the digital phonetic sound or text corresponding to the semantic unit set of "I can correct typing error without backspace", for example, but may still be the digital phonetic sound or text corresponding to the semantic unit set of "I can correct typing at all without backspace" or the digital phonetic sound or text corresponding to the semantic unit set of "I can correct typing era without backspace". This result may be considerably disappointing to the user.

Thus, according to an exemplary embodiment of the present invention, the following additional step may be further performed.

Typically, if predetermined additional information is further used together with the improvement phonetic sound after performing step T2, alternatively, after performing step T1 and before performing step T2, or before performing step T1, the semantic unit improving unit 230 may more precisely specify a semantic unit set corresponding to the improvement phonetic sound on the basis of the additional information as well. Hereinafter, various examples of additional information enabling more precise specifying will be described.

1-1. Partial Spelling

For example, the user may further sequentially utter "e", "r", and "r", in addition to "error" corresponding to the improvement phonetic sound in the foregoing example. In this case, the semantic unit improving unit 230 may recognize that "e", "r", and "r" are a partial spelling for specifying the improvement semantic unit set more precisely in fact on the basis of a preset setting (that is, after a predetermined number of letters are continuously uttered, when an improvement phonetic sound corresponding to the improvement semantic unit set having a front portion sequentially identical to the corresponding alphabets is uttered, the foregoing letters are all regarded as a partial spelling of the improvement semantic unit set) or other machine running technique. This may obviously guarantee more precisely specifying the improvement semantic unit set.

1-2. Military Phonetic Alphabet

For example, the user may sequentially utter "echo", "romeo", and "romeo", in addition to "error" corresponding to the improvement phonetic sound in the foregoing example. In this case, the semantic unit improving unit 230 may recognize that "echo", "romeo", and "romeo" are a partial spelling for specifying the improvement semantic unit set more precisely in fact on the basis of a preset setting (that is, after a predetermined number of military phonetic letters are continuously uttered, when an improvement phonetic sound corresponding to the improvement semantic unit set having a front portion sequentially identical to the corresponding alphabets is uttered, the foregoing letters are all regarded as a partial spelling of the improvement semantic unit set) or other machine running technique.

Meanwhile, in the Korean language, the partial spelling technique may be executed by an interpretation utterance (for example, sequential utterance of "여" and "이" for an improvement semantic unit set of "계발") of a diphthong character hard to specify, and in the Japanese language, the partial spelling technique may be executed by utterance regarding a left side radical of a Chinese character (for example, additional utterance of "山編" (やまへん) in order to prevent an improvement semantic unit set of "嶋田" (しまだ) from being erroneously recognized as "島田" (しまだ).

2. Hint Word

For example, the user may further sequentially utter "of" and "erroneous", in addition to "error" corresponding to the improvement phonetic sound in the foregoing example. In this case, the semantic unit improving unit 230 may recognize that "erroneous" is a hint word (that is, a word having a spelling identical or similar to a word of the improvement semantic unit set correct at least in a portion thereof) for specifying the improvement semantic unit set more precisely on the basis of a preset setting (that is, a setting that when "of" is uttered in a portion where the improvement phonetic sound is uttered, a following word corresponding to a phonetic sound is regarded as a hint word) or other machine running technique. This may obviously guarantee more precisely specifying the improvement semantic unit set. Here, "of" considered as a reserved word may be replaced with another word that can be easily understood by the user or that has a low erroneous recognition rate, such as "like", or the like.

Meanwhile, besides the foregoing example, in a case in which the user utters "Zoe" as an improvement phonetic sound but "Zoe" is recognized as "Joe" to make erroneous improvement, the user may utter "Zoe" once again and further utter a hint word for stressing letters to be included in the correct improvement semantic unit set, such as "Z", "of", and "Zebra", together with the reserved word and the corresponding letters. Accordingly, the semantic unit improving unit 230 may correct the improvement semantic unit set to include the letters of the hint word, that is, "Zoe".

As for the Korean language, in a case in which "안쪽의" is erroneously recognized as "안쪽에", when the user utters "안쪽의" once again and further utters "의자의 의", the semantic unit improving unit 230 may correct the improvement semantic unit set to include "의" of the hint word "의자", that is, to "안쪽의".

In the case of the Japanese language, in order to correct that "感じ" (かんじ) is erroneously recognized as "漢字" (かんじ), "感動の感" (かんどうのかん) may be additionally uttered, or in order to correct that "買いに" (かいに) is erroneously recognized as "海に" (かいに), "買い物の買い" (かいもののかい) may be additionally uttered.

Meanwhile, regardless of language, a word similar in meaning to a correct improvement semantic unit set may be additionally uttered (for example, in order to include "error" in an improvement semantic unit set, a synonym "mistake" may be additionally uttered together with a reserved word "like"), a word in a superordinate-subordinate relationship may be uttered (for example, in order to include "Kia" in an improvement semantic unit set, a relatum "car company" may be additionally uttered together with a reserved word "like"), or an associative word may be additionally uttered (for example, in order to make "개집" become an improvement semantic unit set, an associative word "멍멍" may be additionally uttered together with a reserved word "like", or in order to make "queries" become an improvement semantic unit set, an associative word "database" may be additionally uttered together with a reserved word "for"). That is, when the user further utters a hint word (or a hint character) together with a reserved word in the vicinity of an improvement phonetic sound, the semantic unit improving unit 230 may interpret the hint word and more precisely specify an improvement semantic unit set corresponding to the improvement phonetic sound.

The embodiments of the present invention can be implemented in a form of an executable program command through a variety of computer means recordable to computer readable media. The computer readable media may include solely or in combination, program commands, data files, and data structures. The program commands recorded to the media may be components specially designed for the present invention or may be usable by a skilled person in a field of computer software. Computer readable recording media include magnetic media such as a hard disk, a floppy disk, magnetic tape, an optical media such as a CD-ROM and a DVD, a magneto-optical media such as a floptical disk and hardware devices such as ROM, RAM, and flash memory specially designed to store and carry out programs. Program commands include not only a machine language code made by a complier, but also a high level code that can be used by an interpreter etc., which is executed by a computer. The aforementioned hardware device can work as more than a software module to perform the action of the present invention, and they can do the same in the opposite case.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Accordingly, the scope of the present invention must not be confined to the explained embodiments, and the following patent claims as well as everything including variations equal or equivalent to the patent claims pertain to the category of the scope of the present invention.

The invention claimed is:

1. A computer-implemented method for correcting errors in a captured semantic unit set including a plurality of semantic unit sets input by a user and displayed on a display, the method comprising:
   receiving an analog voice signal of an improvement phonetic sound according to utterance of a user through a voice sensing unit to correct an incorrect semantic unit set within the captured semantic unit set displayed on the display;
   converting, by a processor, the analog voice signal of the improvement phonetic sound to a digital signal of an improvement semantic unit set by performing at least one of a sampling process, a quantization process, and an encoding process;
   specifying, by the processor, the incorrect semantic unit set to be corrected within the captured semantic unit set displayed on the display, on a basis of correlation thereof with the improvement semantic unit set converted from the analog voice signal uttered by the user; and
   replacing, by the processor, the incorrect semantic unit set within the captured semantic unit set displayed on the display with the improvement semantic unit set converted from the analog voice signal uttered by the user;
   wherein the incorrect semantic unit set in the captured semantic unit set displayed on the display is specified, by the processor, by measuring a length of text or a time duration of a digital phonetic signal corresponding to the improvement semantic unit set, dividing the captured semantic unit set into a plurality of portions on a basis of the length of the text or the time duration of the digital phonetic signal corresponding to the improvement semantic unit set, and comparing each of the plurality of portions of the divided captured semantic unit set with the improvement semantic unit set.

2. The method of claim 1, wherein the comparing comprises comparing features of the digital phonetic signal corresponding to each of the plurality of portions of the divided captured semantic unit set with those of the digital phonetic signal corresponding to the improvement semantic unit set.

3. The method of claim 1, wherein the comparing comprises comparing a text corresponding to each of the plurality of portions of the divided captured semantic unit set with the text corresponding to the improvement semantic unit set.

4. The method of claim 3, wherein the comparing of the texts comprises sequentially comparing the texts in terms of phonetic values or spellings.

5. The method of claim 3, wherein the comparing of the texts comprises comparing the texts as to whether the texts belong to a same category or have similar meanings.

6. The method of claim 3, wherein the comparing of the texts comprises comparing the texts on the basis of key position correlation on a keyboard.

7. A computer-implemented method for correcting errors in a semantic unit set captured from a voice according to utterance of a user and including a plurality of semantic unit sets displayed on a display, the method comprising:
   receiving an improvement text inputted by the user through a user interface to correct an incorrect semantic unit set within the captured semantic unit set displayed on the display;
   specifying, by a processor, an improvement semantic unit set on a basis of the improvement text inputted by the user to correct the incorrect semantic unit set;
   specifying, by the processor, the incorrect semantic unit set to be corrected within the captured semantic unit set displayed on the display, on a basis of correlation thereof with the improvement semantic unit set converted from the analog voice signal uttered by the user; and
   replacing, by a processor, the incorrect semantic unit set within the captured semantic unit set displayed on the display with the improvement semantic unit set converted from the analog voice signal uttered by the user;
   wherein the incorrect semantic unit set in the captured semantic unit set displayed on the display is specified, by the processor, by measuring a length of text or a time duration of a digital phonetic signal corresponding to the improvement semantic unit set, dividing the captured semantic unit set into a plurality of portions on a basis of the length of the text or a the time duration of a digital phonetic signal corresponding to the improvement semantic unit set, and comparing each of the plurality of portions of the divided captured semantic unit set with the improvement semantic unit set.

8. A non-transitory computer-readable recording medium storing a computer program for enabling a computer to execute the method for correcting errors in the captured semantic unit set which is input by the user and including the plurality of semantic unit sets, according to claim 1.

9. An apparatus for correcting errors in a captured semantic unit set including a plurality of semantic unit sets input by a user and displayed on a display, the apparatus comprising:
   a voice sensing unit configured to receive an analog voice signal of an improvement phonetic sound according to utterance of a user to correct an incorrect semantic unit set within the captured semantic unit set displayed on the display;
a voice processing unit configured to convert the analog voice signal of the improvement phonetic sound to a digital signal of an improvement semantic unit set by performing at least one of a sampling process, a quantization process, and an encoding process; and
a semantic unit improving unit, including at least one processor, configured to specify, the incorrect semantic unit set to be corrected within the captured semantic unit set displayed on the display, on the basis of correlation thereof with the improvement semantic unit set converted from the analog voice signal uttered by the user, and to replace the incorrect semantic unit set within the captured semantic unit set with the improvement semantic unit set displayed on the display;
wherein the incorrect semantic unit set in the captured semantic unit set displayed on the display is specified, by the at least on processor, by measuring a length of text or a time duration of a digital phonetic signal corresponding to the improvement semantic unit set, dividing the captured semantic unit set into a plurality of portions on a basis of the length of the text or the time duration of the digital phonetic signal corresponding to the improvement semantic unit set, and comparing each of the plurality of portions of the divided captured semantic unit set with the improvement semantic unit set.

10. An apparatus for correcting errors in a semantic unit set captured from a voice according to utterance of a user and including a plurality of semantic unit sets displayed on a display, the apparatus comprising:
means configured to receive an improvement text inputted by the user through a user interface to correct an incorrect semantic unit set within the captured semantic unit set displayed on the display; and
a semantic unit improving unit, including at least one processor, configured to specify an improvement semantic unit set on a basis of the improvement text inputted by the user to correct the incorrect semantic unit set, to specify, the incorrect semantic unit set to be corrected within the captured semantic unit set, on a basis of correlation thereof with the improvement semantic unit set, and to replace the incorrect semantic unit set within the captured semantic unit set with the improvement semantic unit set;
wherein the incorrect semantic unit set in the captured semantic unit set displayed on the display is specified, by the at least on processor, by measuring a length of text or the time duration of the digital phonetic signal corresponding to the improvement semantic unit set, dividing the captured semantic unit set into a plurality of portions on a basis of the length of the text or the time duration of the digital phonetic signal corresponding to the improvement semantic unit set, and comparing each of the plurality of portions of the dividing captured semantic unit set with the improvement semantic unit set.

* * * * *